3,119,696
PROCESSES FOR TENDERIZING MEAT EMPLOYING WATER AND GAS UNDER PRESSURE

Beverly E. Williams, La Grange Park, Ill., assignor, by mesne assignments, to Chas. Pfizer & Co., Inc., New York, N.Y., a corporation of Delaware
No Drawing. Filed May 2, 1961, Ser. No. 107,020
2 Claims. (Cl. 99—107)

This invention relates to processes for tenderizing meat such as beef, lamb and veal, pork and the like, and more particularly to such processes in which water and gas under pressure are injected into the carcass on or adjacent to the killing floor before the completion of rigor mortis to improve the tenderness of the meat; to improve its color and appearance; and to improve and increase the plumpness of the meat, and to increase the tenderness, flavor and juiciness of cooked beef, lamb, veal and pork.

I have heretofore proposed the stitch pumping of edible animal carcasses on the killing floor before rigor mortis with solutions of various agents both for tenderizing and for improving the flavor of the meat. I have also proposed the stitch pumping of carcasses on the killing floor before rigor mortis with water under pressure to improve the tenderness of the meat.

I have now found most unexpectedly, that if water by itself or containing additives which may be desirable in accordance with my earlier proposal, is stitch pumped into the carcass before rigor mortis is completed, utilizing a gas under pressure to expand the fibers of the meat that, not only is the tenderness of the meat greatly and unexpectedly improved, but the meat is plumpened by the gas and the red meat color is brightened and greatly improved in appearance. I have found that the gas may be utilized before injection of the water, during and with the injection of the water or after the water has been injected. The gas, under pressure, may provide the pressure for the water or fluid to be injected. In all of these procedures the gas acts to spread the fibers of the meat and to disperse the water throughout the meat. The fibers of the meat are penetrated, separated and saturated by the water. The gas and water under pressure will separate the muscle bundle fibers and the meat fibers to enhance the tenderness of the meat and the improved dispersion of the water in the meat greatly improves the tenderness of the meat upon cooking.

It is therefore the object of the present invention to provide novel processes for tenderizing and improving meat in which gas and water, both under pressure, are stitch pumped into the carcass, preferably on the killing floor, and before rigor mortis is completed.

I have found that there is a critical range of pressures for the gas under pressure. If a gas pressure of less than approximately 30 pounds per square inch is empolyed the gas is not able to disperse promptly and completely throughout the meat and the desired improved dispersion of the water is not obtained. If the gas pressure is over approximately 110 pounds per square inch the muscle bundle fibers and the meat fibers are unduly distended or ruptured and the meat becomes bloodshot. Further, such high pressures have a tendency to balloon the meat and inflate it to an undesirable degree. Gas pressures between approximately 40 pounds per square inch and approximately 100 pounds per square inch have proved to be satisfactory in providing for the desired dispersion of the water in the meat without undue distortion or rupturing of the muscle bundle fibers and do not produce undesirable ballooning or sponge-like inflation of the meat.

While air is the preferred gas to employ with water in the present process, because of its availability and because the oxygen in the air oxidizes the myoglobin or coloring material in the muscle blood and makes it lighter and brighter red, which is highly desirable, other gases can be employed. One such gas containing approximately 85% nitrogen, 12% carbon dioxide and 1 to 3% carbon monoxide with traces of hydrogen, ketones and the like, as generated and obtained by burning butane or propane in the absence of air, is an excellent gas for present purposes because the carbon monoxide brightens the color of the meat without oxidation. Other inert gases such as nitrogen, carbon dioxide, and the like can also be used.

The amount of water which may be used in accordance with the present concept is, as I have previously proposed, approximately up to 3%, and not more than 5%, by weight of the warm carcass to be stitch pumped. The expanded and increased size of the meat makes possible the accommodation by the meat of the higher percentage of fluid. The water may be used at body temperatures of approximately 100° F. In all cases, the temperature of the injected medium should be as high or higher than the body temperature of the dressed animal so injected. When the meat is warm just after killing and before the onset or completion of rigor mortis, the gas utilized expands the meat tissues, makes them sponge-like and improves the absorptive power of the tissues for the added moisture which, amounting to preferably 3% of the warm carcass weight, adds to the carcass weight that amount of weight which will subsequently be lost by evaporation during the hanging of the meat in the cooler. 3% by weight of the warm carcass of water is stitch pumped into the carcass preferably with the gas and approximately 9 pounds of water per 300 pound side of meat is employed, distributed between the round, chuck, loin, rib and rough cuts, such as plate, which includes the brisket and navel-end.

In accordance with my earlier proposals, the water stitch pumped into the carcass, can contain a fraction of a gram of a proteolytic enzyme and other suitable additives such as salts, phosphates, sodium hexametaphosphate, lactic acid, ascorbic acid, gelatin and the like for better moisture retention by the meat and for flavoring and firming-up the meat. The enzymes used can be those which enhance the flavor of the meat. When gelatin is used in the pumping solution, a proteolytic enzyme is generally not used because of the affinity of the enzyme for the protein gelatin.

As noted above, the size of the meat is increased by inflation due to the air or gas pumped into the meat. The meat will expand approximately 10% at the air pressures described above. Although the meat bulges considerably under the impact of the air, it subsides with the gradual escape of air, but I have found that by following up with a stitch-pumped fluid a permanent increase in the size of the carcass and of the size of the individual cuts can be approximately 10%. The loin, rib, chuck and round steaks are approximately 10% larger in diameter than mate steaks cut from a control side. When steaks are cut one inch thick from a side treated in accordance with the present invention, one or two additional steaks can be obtained from each loin and round and the same approximate 10% increase in size is obtained in the rib, chuck and rump roasts.

In accordance with the present invention, several steers dressing approximately 600 pounds each were, shortly after slaughter and before completion or rigor mortis, and while the flesh was still flaccid, stitch pumped with approximately 3% by weight of body-temperature water and air under pressure of approximately 80 pounds per square inch. One side only of each carcass was so treated and the other side was dressed in the usual manner to act as the control side for subsequent organoleptic testing.

After stitch pumping in accordance with the above, treated and mate sides were then placed in a conventional cooler and held at approximately 35° F. for 7 days. The treated sides were then ribbed and cut into primal cuts and compared with their control mates. The treated sides produced rib eyes and primal cuts that were much plumper than the control sides and were therefore more desirable and had a considerable price and sales advantage. The cuts from the treated sides were brighter and lighter in red meat color than the cuts from the control sides. This was evident immediately upon ribbing, both to beef men and chain store buyers.

Steaks from the treated sides were then organoleptically tested by an eating panel for comparison with mate steaks from the control side. In every instance the steaks from the treated side were found to have unexpectedly improved tenderness.

It is the concensus of opinion of meat packers who have witnessed the processes of the present invention carried out on the killing floor and have then viewed and tested the treated side as compared to the control side of the carcass that the gas under pressure, actually bulging the meat at the same time of stitch pumping, forces the water into the expanded interstices of the muscle and meat fibers. When the meat is thereafter chilled in the cooler, the added water remained in the expanded interstices, actually making the meat plumper. The expanded porous structure of the meat better accommodates the added moisture, thus obviating any tendency of the fluid to collect in pockets. There is no evidence of the added water in the meat of the treated sides.

It is therefore apparent that by the present invention I have in every way satisfied the objective discussed above.

While I prefer to stitch pump edible animal carcasses such as beef, lamb and veal before completion of rigor mortis and or adjacent to the killing floor, simultaneously with water and gas, it is within the concept of the present invention to stitch pump and inflate the carcass with the gas either before or after injection of the water to aid in the dispersement of the water throughout the pores of the meat. As pointed out above, various gases may be employed and various additives may be utilized with the water or fluid. Other carcasses than beef, lamb or veal may be treated. Those skilled in the art may now have modifications to the above described illustrative embodiments of the present invention suggested to them without departing from the present inventive concept. Reference should therefore be had to the appended claims to determine the scope of this invention.

What is claimed is:

1. A method for increasing the tenderness, flavor and juiciness of cooked beef, lamb, veal, and pork, the steps of adding inert gas and water in the muscle portion of the meat by multiple entry injection of approximately 3% water by weight under pressures of from 30 to 100 pounds per square inch and at a temperature approximating the animal's body temperature, directly into the muscle of freshly slaughtered animals before completion of rigor mortis whereby the muscle bundle fibers are uniformly expanded by the gas and penetrated, separated and saturated by the water thereby promoting hydrolytic activity of the natural enzymes during normal storage of the meat and increasing the tenderness of the meat in the cooking process.

2. A method for increasing the plumpness, size and firmness and improving the red meat color of beef, lamb, veal and pork, the steps of adding inert gas and water in the muscle portion of the meat by multiple entry injection of approximately 3% water by weight under pressures of from 30 to 100 pounds per square inch and at a temperature of approximately 100° F. directly into the muscle of freshly slaughtered animals before completion of rigor mortis whereby the muscle bundle fibers are uniformly expanded by the gas and penetrated, separated and saturated by the water thereby promoting hydrolytic activity of the natural enzymes during normal storage of the meat and increasing the tenderness of the meat in the cooking process.

References Cited in the file of this patent

UNITED STATES PATENTS

| | | |
|---|---|---|
| 2,241,030 | Hess | May 6, 1941 |
| 2,805,163 | Williams et al. | Sept. 3, 1957 |
| 3,006,768 | Williams | Oct. 31, 1961 |